UNITED STATES PATENT OFFICE.

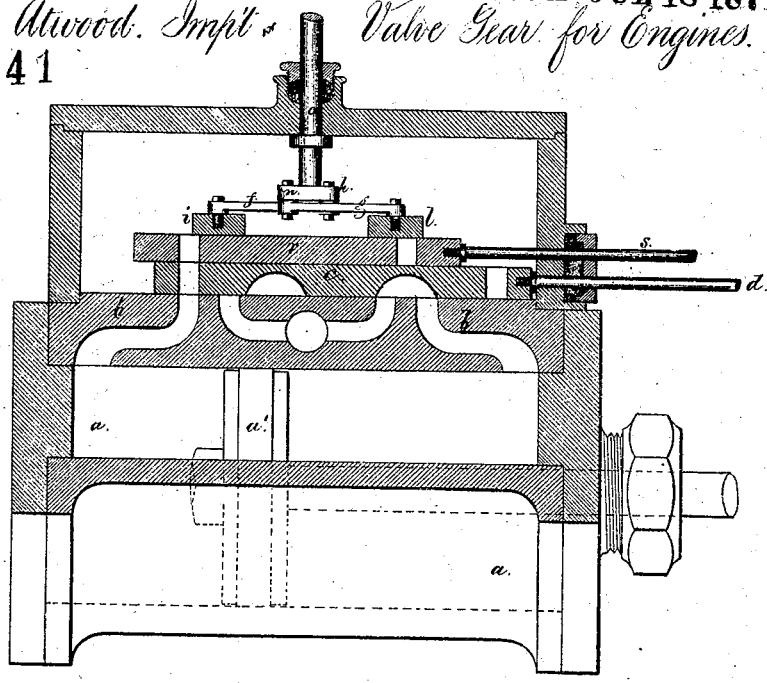
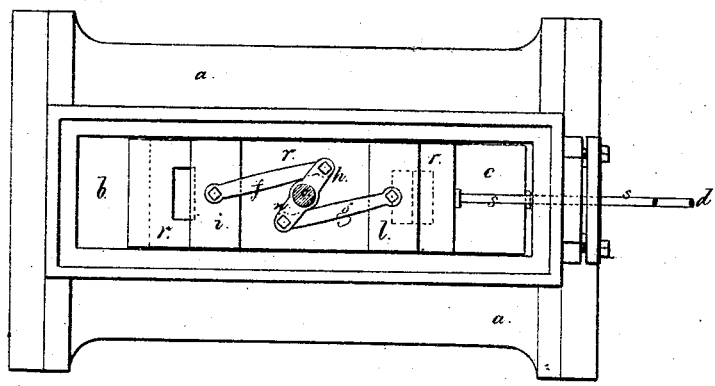

LEONARD ATWOOD, OF NEW YORK, N. Y., ASSIGNOR TO P. H. WALKER, OF BOSTON, MASSACHUSETTS.

IMPROVEMENT IN VALVE-GEARS FOR ENGINES.

Specification forming part of Letters Patent No. 117,141, dated July 18, 1871.

*To all whom it may concern:*

Be it known that I, LEONARD ATWOOD, of the city and State of New York, have invented an Improvement in Valve-Gear for Engines; and the following is declared to be a correct description of the same.

This invention is designed for cutting off the supply of steam at any desired point by a movement derived from the governor. I make use of movable cut-off plates connected by links with cranks on opposite sides of a shaft that is turned by a connection to the governor or otherwise, so as to cover, by said plates, the inlet-ports to a greater or lesser extent, according to the speed of the engine. The main valves, sliding between these cut-off plates and the valve-seat, do not tend to revolve the shaft, because the arrangement of the cranks and links is such that the action is balanced, the friction upon one plate tending to move the shaft in one direction, and the friction on the other acting in the opposite direction, and, being equal, they balance; hence the governor can move the cut-off plates with ease.

In the drawing, $a$ represents the cylinder, in which is a piston, $a'$, and $b$ is the valve-seat. $c$ is the main valve, moved by the rod $d$, and $r$ is the secondary or cut-off valve upon the valve $c$, and moved by the rod $s$. These parts are of any usual size and proportion, and the ports are made in any usual way and do not need further description. The valve $r$ is made with the inlet-ports through it, so that a seat will be provided upon its upper surface for the cut-off plates $i$ and $l$, and these are connected, by the links $f$ and $g$, to the cranks $h$ and $n$ upon the shaft $o$ that passes through the steam-chest at right angles to the valve $r$, and to this shaft $o$ a connection is made to a governor or other device for changing the position of the cut-off plates $i$ $l$, so as to thereby regulate the speed of the engine. It will be apparent that the movement of the valve $r$ between the cut-off plates and the valve $c$ will not tend to move the shaft $o$, because while the friction on one of the plates tends to move the shaft $o$ in one direction the friction on the other tends to move it in the other direction; hence the one balances the other, and the parts can be moved with great ease by the governor or by hand, and in that position the shaft $o$ will remain until again moved by the governor or by hand. The edges of these cut-off plates, closing the ports through the valve $r$ more or less quickly, according to the positions of such plates, cut off the steam at whatever portion of the stroke may be desired.

I am aware that cut-off plates operated by cams have been employed between the valve and seat; but in this construction the friction upon the cut-off plates is much greater than in my improvement, and the links and cranks I employ move with much less friction than the said cams, hence can be easily operated by the governor.

I claim as my invention—

A pair of cut-off plates on the upper surface of the valve connected to cranks on the opposite sides of a shaft that is turned to control the cut-off action of such plates, substantially as set forth.

Signed by me this 13th day of February, A. D. 1871.

LEONARD ATWOOD.

Witnesses:
CHAS. H. SMITH,
GEO. T. PINCKNEY.